United States Patent

[11] 3,634,759

| [72] | Inventors | Tsuneji Koshikawa<br>Tokorozawa;<br>Masaharu Kobayashi, Hachioji, both of<br>Japan |
|---|---|---|
| [21] | Appl. No. | 47,635 |
| [22] | Filed | June 18, 1970 |
| [45] | Patented | Jan. 11, 1972 |
| [73] | Assignee | Hitachi, Ltd.<br>Tokyo, Japan |
| [32] | Priority | June 20, 1969 |
| [33] | | Japan |
| [31] | | 44/48243 |

[54] FREQUENCY SPECTRUM ANALYZER WITH A REAL TIME DISPLAY DEVICE
4 Claims, 11 Drawing Figs.

[52] U.S. Cl. ................................................ 324/77, 179/1
[51] Int. Cl. ............................................... G01n 23/16
[50] Field of Search ............................................ 324/77; 179/1, 15.55

[56] References Cited
UNITED STATES PATENTS
3,566,035   2/1971   Noll et al. ..................... 324/77 X

*Primary Examiner*—Edward E. Kubasiewicz
*Attorney*—Craig, Antonelli & Hill

ABSTRACT: A device for analyzing the frequency spectrum of each of two input signals such as sound signals or ultrasonic signals comprising a number of different frequency components, presenting a real time display of the time-sequential variations in the intensities of the signals at the respective frequency components, and displaying the analytical results of the two signals in mutually opposing positions about the display screen.

FREQUENCY SPECTRUM ANALYZER WITH A REAL TIME DISPLAY DEVICE

This invention relates to a frequency spectrum analyzer for sonic or ultrasonic signals.

In the known frequency spectrum analyzers such as speech recognition devices, fathometers or sonars, it is required to quickly and accurately analyze the frequency spectrum of input signals and display the results of the analysis.

Such requirements have been met by the frequency spectrum analyzer developed by the inventors and disclosed in U.S. application, Ser. No. 775,343, now U.S. Pat. No. 3,581,192. That analyzer is of the so-called real time analysis type which analyzes an input signal such as speech having time-sequentially variable frequency components as soon as it is imparted, and displays the result of the analysis on a display device such as a cathode-ray tube. The vertical and horizontal axes of the display screen are used for the representation of time and frequency respectively and the intensities of the signal displayed in the two-dimensional plane are presented in colors, whereby the characteristic of the input speech signal can be instantaneously recognized.

A primary object of the present invention is to provide an improved frequency spectrum analyzer wherein two input signals are applied for simultaneous analyses and the analytical results can be displayed for contrast on a common display device. Such an improved analyzer would find more effective use in various fields which require the comparison between two different signals or patterns such as the reference pattern of the teacher's speech and the pattern of the student's speech in language or music teaching, the normal and abnormal noise patterns from a machine during the location of faults, or the normal and abnormal patterns of the signal from a patient during the diagnosis at hospitals or clinics.

Another object of the present invention is to provide an analyzer of the described type wherein patterns to be displayed are colored to facilitate the recognition of the patterns.

Still another object of the present invention is to provide an analyzer of the described type wherein the display field may be moved with the time-sequential variation of input signals and additionally any desired area of the display field may be selected for stationary display.

Other objects and features of the present invention will become fully apparent from the following description taken in conjunction with the accompanying drawings, in which:

Figure 1:
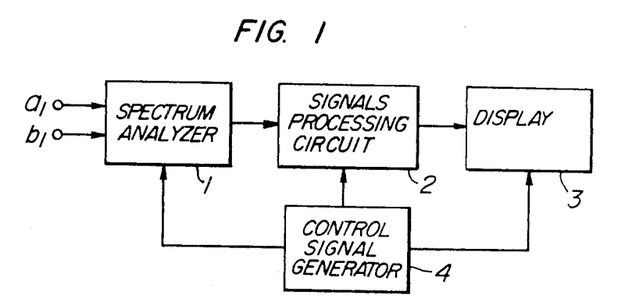
FIG. 1 is a block diagram showing the basic arrangement of the present invention.

Referring to FIG. 1, the basic arrangement of the present invention includes a real time frequency spectrum analyzer 1 for analyzing the frequencies of two input signals $a_1$ and $b_1$ applied to two input terminals and time-compressing these two signals to thereby analyze the frequencies of such time-compressed signals and derive the frequency spectrum of each signal alternately at predetermined intervals (the frequency spectrum for such an interval is hereinafter referred to as a "spectrum section"). Signal processing unit 2 is provided to process the outputs of the analyzer 1, i.e., two spectrogram signals, so that these signals may be separately displayed on a display device 3 vertically or horizontally thereof. The display device 3 may be a cathode-ray tube. A control signal generator 4 is arranged to supply timing and control pulses to the signal processing circuit and the display device. Each of these various units will now be described individually.

I. Real Time Frequency Analyzer

Figure 2:
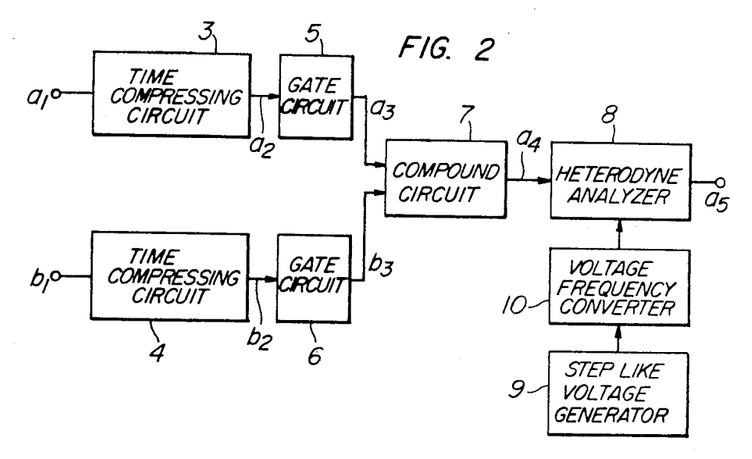
FIG. 2 is a block diagram showing an example of the real time frequency analyzer according to the present invention.

FIG. 2 shows in block diagram the arrangement of the real time frequency analyzer 1. Two input signals $a_1$ and $b_1$ to be analyzed and displayed are time-compressed at a predetermined ratio by time-compressing circuits 3 and 4, respectively.

Figure 3:
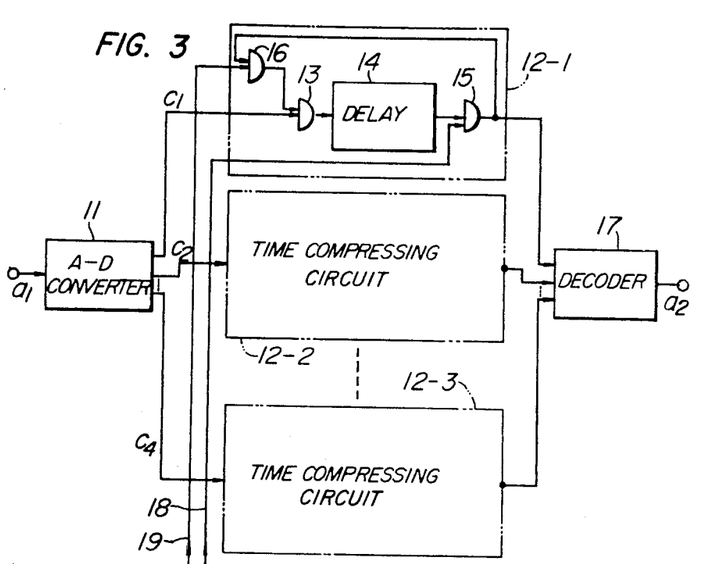
FIG. 3 is a diagram showing the time-compressing circuit used with the present invention.
Figure 4:
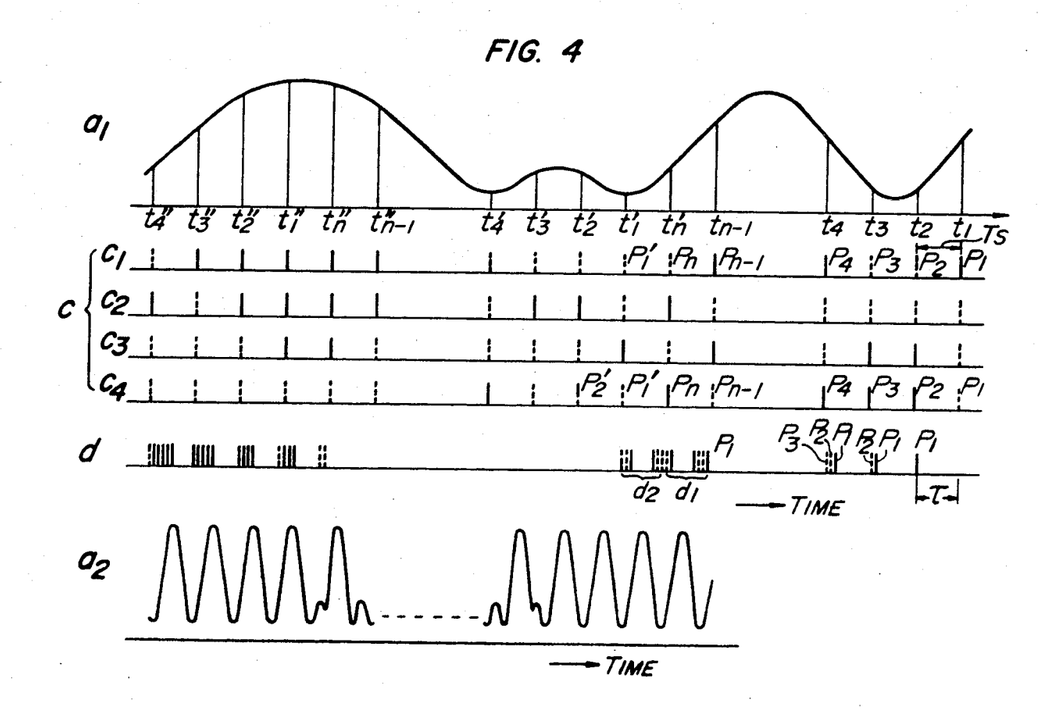
FIG. 4 is a time chart for illustrating the operating of the time-compressing circuit shown in FIG. 3.

The construction of the time compressing circuit 3 or 4 is schematically shown in the block diagram of FIG. 3, and the operation thereof is illustrated in the time chart of FIG. 4. Referring to FIG. 3, an analog-digital (A-D) converter 11 is provided for sampling analogous input signals to be analyzed such as a $a_1$ in FIG. 4 at predetermined period $T_s$ and encoding the signals into digital signals comprising a plurality of bits. Such digital signals will be hereinafter referred to as binary-coded signals of four figures. If these encoded signals appear in parallel to each other, parallel coded signals as shown at $c$ in FIG. 4 will be produced as the outputs of the A-D converter 11. These outputs are respectively applied to time-compressing circuits 12–1, 14–2, 12–3 and 12–4 connected with respective bit output circuits.

The operation of the time-compressing circuits will be described typically with respect to the circuit 12–1 for a first bit. A bit pulse initially produced at a point of time to $t_1$ is passed through a gate circuit 13 and delayed for a predetermined time $$\tau = T_s\left(1 - \frac{1}{n}\right)$$

by a delay circuit 14, then applied through a gate circuit 15 partly to a decoder 17 and partly to a gate circuit 16. A signal 18 applied to the gate circuit 15 is a clock pulse having a period of $T_s/n = T_c$, which is directed to compensate for the timing of the output pulse of the delay circuit 14. Another signal 19 applied to the gate circuit 16 is such a pulse signal having a period of $T_s$ that the gate circuit 16 is closed at points of time when pulses $P_1, P_2, ..P_n$ enter, and this signal is intended to prevent the pulse in the loop 13–14–15–16–13 from repeating more than $n$ times. This will be explained more particularly by reference to FIG. 4.

If the signal starts at the point of time $t_1$, the output of the gate circuit 15 (namely input to the decoder 17) will take the form as shown at $d$ in FIG. 4. In other words, between points of time $t_{n-1}$ and $t_n$, pulse signals $P_1, P_2, ..P_n$ preceding the point of time $t_n$ are time-sequentially disposed with a period of $T_c$. This means that pulses $P_1, P_2, P_3,..P_{n-1}$ have been produced at points of time $t_1+\tau(n-1)$, $t_2+\tau(n-2)$, $t_3+\tau(n-3)$,..$t_{n-1}+\tau \times 1$, respectively, and accordingly that the pulse signals shown at $c$ in FIG. 4 have been time-compressed to $1/n$. These signals $d$ (shown as bits of one figure for the convenience of illustration) are decoded by the decoder 17 into the form as shown at $a_2$ in FIG. 4. That is to say, signals from time $t_1$ to $t_n$ have been compressed between the points of time $t_{n-1}$ and $t_n$ and input signals from time $t_2$ to $t'_1$ have been compressed between points of time $t'_1$ and $t_n$, and so on.

The time-compressing circuit 4 has entirely the same construction as the time-compressing circuit 3 described above and shown in FIG. 2. The two analogous signals $a_2$ and $b_2$ time-compressed in the described manner are alternately selected for a predetermined period $t_{ss}$ to produce intermittent analogous signals $a_3$ and $b_3$ and these outputs are formed into a series of continuous signals $a_4$ by a compound circuit 7. The time relation between these signals is shown in the time chart of FIG. 5. Although these are actually more complicated analogous signals, they are shown simply in block form. The period $T_{ss}$ mentioned above will suffice if it satisfies the following relation with the sampling period $T_s$:

$T_{ss}=n'T_s$, where $n' \leq n/2$

Subsequently, signal $a_4$ is analyzed with respect to each constituent frequency component thereof. The present embodiment comprises a heterodyne analyzer 8. A steplike voltage generator 9 is provided to generate a steplike voltage wave as shown at $e$ in FIG. 5 (number of steps being $n$), and the steplike voltage wave is formed into a steplike variable carrier wave (or a signal frequency modulated by the signal $e$) by a voltage-frequency converter 10, and mixed with the time-compressed signal $a_4$. The resulting output is subjected to heterodyne detection by the heterodyne analyzer 8 to provide the analysis output as shown at $a_5$ in FIG. 5. From this analysis output, there are alternately derived the analytical results of the signals $a_1$ and $b_1$. The analytical results in these sections, i.e., in the shown periods $T_{ss}$, are referred to as "spectrum sections." In other words, these spectrum sections may be said to be a time-sequential arrangement of the constituent frequency components of the analyzed signals. Thus, the frequencies are represented along the time axis so that the amplitude of the spectrum component of each frequency is represented as the amplitude of the spectrum section wave.

II. Signal Processing Unit

Figure 6:
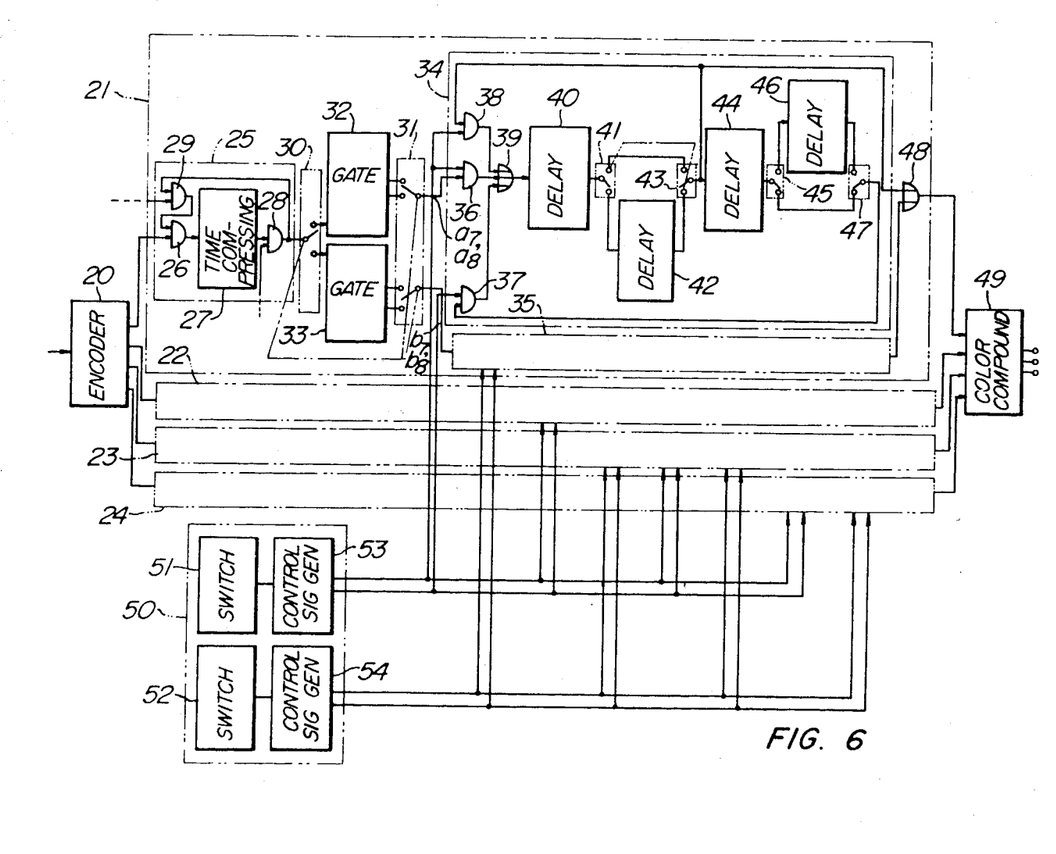
FIG. 6 is a circuit diagram showing an example of the signal processing means used with the present invention.

As has previously been described with respect to FIG. 1, the signal processing unit 2 converts the analyzed signals $a_1$ and $b_1$ into signals suitable to be simultaneously displayed for contrast at vertically or horizontally separate areas by the signal display device 3. FIG. 6 shows in block diagram the signal processing unit.

First, the time-sequential wave $a_5$ in the spectrum section of the two signals is converted into a scale-of-$m$ coded signal by an encoder ($m$ being an integer). The scale-of-$m$ coded signal is derived in the form of parallel signals comprising a predetermined number of figures. In the present embodiment the number of figures is four, so that the output of the encoder 20 comprises four parallel pulse signal trains. The pulse trains are processed by circuits 21, 22, 23 and 24 forming signal processing circuits, in the manner to be described. The circuits 21 to 24 are all identical and only the circuit 21 will be described.

Figure 5:
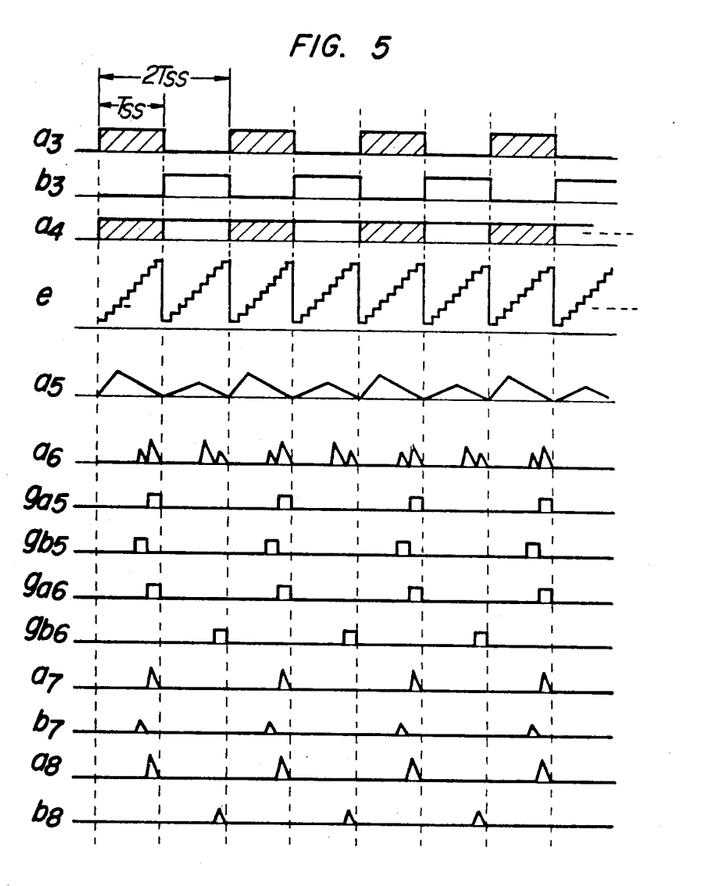
FIG. 5 is a time chart for illustrating the operation of the signal processing means used with present invention.

The pulse signals are time-compressed by a time-compressing circuit 25, which has entirely the same construction and function as that shown in FIGS. 3 and 5. The parts 26, 27, 28 and 29 of the time-compressing 25 correspond to the parts 13, 14, 15 and 16 shown in FIG. 3. Time-compressed pulse trains from the time-compressing circuit 25 are applied to interlocking switches 30 and 31 and gate circuit 32 or 33, whereby there are derived signals only in predetermined gate sections. By these gate actions as well as by the memory operation and switching operation to be described, the analytical spectrograms of the two input signals are displayed in the form of vertically or horizontally separate patterns on the screen of the display tube.

If the aforesaid time compression and gate actions are caused to correspond to analogous signals, the time-sequential wave in the spectrum section after time-compression will take the form as shown at $a_6$ in FIG. 5. When the output $a_6$ of the time-compressing circuit has been connected with a gate circuit 32, certain sections of the signal are selected by gate signals $g_{a5}$ and $g_{b5}$ to provide signals $a_7$ and $b_7$ which have resulted from the time-compression of the spectrum section waves of the input signals $a_1$ and $b_1$, respectively. According to the same principle, when the output of the time-compressing circuit has been connected with the gate circuit 33, certain sections of the signals are selected by gate signals $g_{a6}$ and $g_{b6}$ to provide signals $a_8$ and $b_8$ which have resulted from the time-compression of the spectrum section waves of the input signals $a_1$ and $b_1$, respectively.

These signals $a_7$ (or $a_8$) and $b_7$ (or $b_8$) are applied to circuits 34 and 35 respectively. In other words, the signal applied to the circuit 34 is a group pulse wave appearing in the section where the gate signal $g_{a5}$ or $g_{a6}$ exists, while the signal applied to the circuit 35 is a group pulse wave appearing in the section where the gate signal $g_{b5}$ or $g_{b6}$ exists. The circuits 34 and 35 are substantially identical in operation and arrangement and only the circuit 34 is illustrated. The operation of these circuits is shown in the time chart of FIG. 7. The individual operations of these circuits are controlled by pulse signals, and in order to make such control more readily understood, the control pulse signals are shown in analogous signal waveform corresponding to the pulse signal group.

Referring to FIG. 6, there is provided a control signal generator circuit 50 for changing over the display mode. In other words, this circuit determines whether to provide a moving display which means that analytical results or spectrograms move in the screen of the display device at a predetermined velocity upon application of input signals or to provide a stationary display which means that the analytical results relating to the portions of the input signals corresponding to a predetermined point of time are fixedly displayed on the display screen. In order to provide a moving display, i.e., a display in which the results of the real time analysis appear on the display screen as images or patterns moving with time-sequential variation in the analyzed input signals, a switch 51 or 52 is operated so as to bring the gate circuits 36 and 38 into "ON" position or to open the gates and to bring the gate circuit 37 into "OFF" position or to close this gate, whereby a control signal is generated by a control signal generator circuit 53 or 54. In order to attain a stationary display, the circuits are brought into converse positions, that is, the gate circuits 36 and 38 are closed and the gate circuit 37 is opened. The circuit operation will now be described with respect to the moving and stationary displays respectively.

II-1. Moving Display

Figure 7:
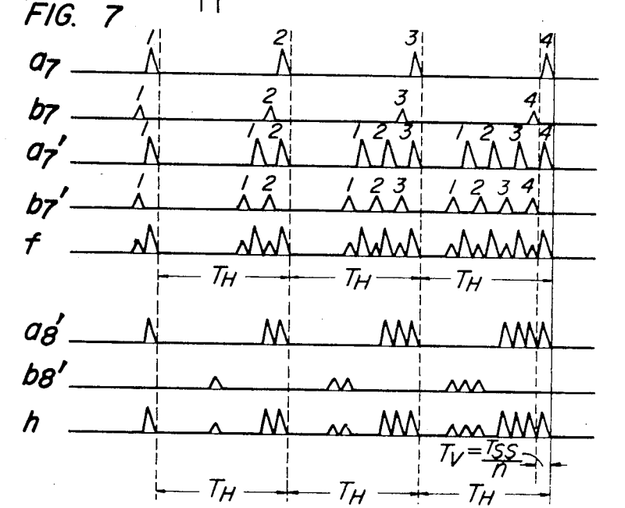
FIG. 7 is a time chart for illustrating the operation of the signal processing means shown in FIG. 6.

In FIG. 6, when the changeover switch is connected with the gate circuit 32, a signal as shown by $a_7$ in FIG. 7 is applied through gate circuit 36 and OR-circuit 39 to a delay circuit 40, where the signal is delayed by a time $$2T_{ss}\left(1-\frac{1}{n}\right).$$

When the changeover circuits 41 and 43 are closed with respect to upper contacts as viewed in the figure, a part of the output thereof is applied through the gate circuit 38 to the OR-circuit again, and circulates along this loop. The other part of the output is applied to an OR-circuit 48, where this signal component has its period compressed to $1/n$ as shown at $a'_7$ in FIG. 7, so that $n$ pulse groups (1), (2), (3), (4) and so on are disposed within a time $2T_{ss}$. A signal $b_7$ as shown in FIG. 7 enters the circuit 35 (whose construction is not shown but entirely identical with that of the circuit 34), where a signal $b'_7$ is provided as output. As a result, the output of the OR-circuit 48 and accordingly the output of the signal processing circuit 21 will take such a form as shown at $f$ in FIG. 7.

The pulse signals of various digital figures thus provided by the processing circuits 21, 22, 23 and 24 are converted by a color signal compound circuit 49 into three primary color signals representative of red, green and blue having amplitude values corresponding to the amplitude values of the spectrum sections. The correspondence between the amplitude values and the color signals can be accomplished as by setting the maximum and minimum amplitude values to red and blue respectively and the intermediate amplitude value to a predetermined number of two-color mixtures composed of red-green and green-blue. These three color signals are applied to a color display device 3, to which there are also applied longitudinally and transversely thereof a timing signal having a period of $T_t=T_{ss}/n$ or $2T_{ss}/n$ and a timing signal having a period of $2T_{ss}$, respectively.

For the spectrum section time-sequential waves $a'_7$ and $b'_7$ shown in FIG. 3, the spectrograms of the signals $a_1$ and $b_1$ each are separately displayed upwardly and downwardly of the display screen by selecting the period of the vertical timing signal to $2T_{ss}/n$, i.e., twice the period $T_{ss}/n$ of each spectrum section.

For the set of spectrum section waves $a_8$ and $b_8$ which is the set of waves produced upon connection of the changeover switches with the gate circuit 33, a delay element 33 provides a delay greater by $T_{ss}/n$ than for the waves $a_7$ and $b_7$ so that the time delay $\tau$ of the group pulse satisfies a relation $\tau=2T_{ss}(1-\frac{1}{2}n)$. In this case, the switches 41 and 43 are connected with their lower contacts.

Figure 8:
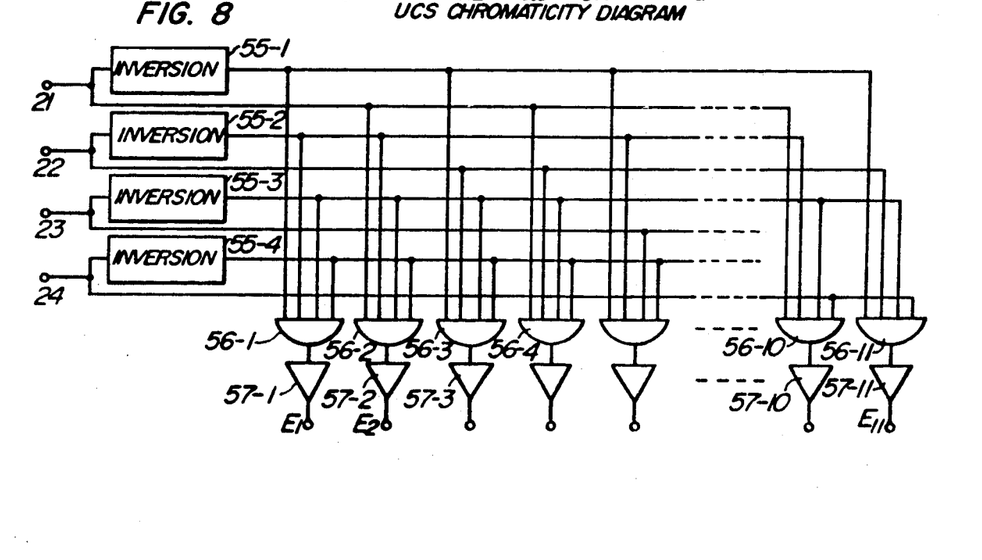
FIG. 8 is a circuit diagram showing the decoder used with the present invention.

As a result of the time delay thus provided, the waves $a_8$ and $b_8$ in FIG. 8 take the form of $a'_8$ and $b'_8$. These waves are further formed into a single time-sequential wave as shown at $h$. Here, the vertical timing signal has a period of $T_{ss}/n$. Consequently, the spectrograms of the signals $a_1$ and $b_1$ are separately displayed leftwardly and rightwardly of the display screen. It can also be seen from the waves $a'_7$ and $b'_7$ or $a'_8$ and $b'_8$ in FIG. 7 that the spectrum sections sequentially move along the time axis within the frame corresponding to $2T_{ss}$ each time these signals are swept once for each along the horizontal axis during a period $2T_{ss}$. As a result, the spectrograms will horizontally flow to provide a moving display like an electric talking-sign.

II-2. Stationary Display

Operation will now be described with respect to the case where the moving spectrographic patterns are stopped fixedly at a desired point of time.

In general, to stop a moving image or pattern is to fix the viewer's memory of that image or pattern and cause individual spectrum sections to appear at predetermined parts of the display screen. This will actually involve the processes as will now be described. As soon as the moving display mode is changed over into the stationary display mode, (1) inputs are blocked, (2) the repetitive delay loop for the moving display is opened, (3) the time delay is made equal to the period $2T_{ss}$ of the horizontal timing signal, and (4) a loop for repeatedly presenting the same pattern is provided by the time delay $2T_{ss}$.

Referring now to the embodiment of FIG. 6, the stationary display is provided by opening the gate circuits 36 and 38 and closing the gate circuit 37 as mentioned previously. Therefore, new inputs are blocked and at the same time the delay loop 39-40-43-38-39 is cut off. Since the gate circuit 37 is closed, there is formed a loop 39-40-43-44-45-47-37-39 including additional delay circuits 44 and 46 and changeover switches 45 and 47. These delay circuits 44 and 46 have their time delay set to a value equal to $T_{ss}/n$. Therefore, in order that the displayed image resulting from the analysis of two input signals may be divided into two horizontally separate patterns, the changeover switches are closed with respect to their lower contacts as viewed in FIG. 6, so that only the delay circuit 44 is added. Thus, the aforesaid time delay $T_{ss}/n$ is added to the time delays of the delay circuits 40 and 42, to provide an overall time delay as follows:

$$2T_{ss}(1-1/n)+(T_{ss}/n)+(T_{ss}/n)=2T_{ss}$$

In order to divide the image into vertically separate patterns, the switches 41, 43, 45 and 47 in the circuit 34 of FIG. 6 are closed with respect to their upper contacts as viewed in the figure, to thereby eliminate the delay element 33 and insert an additional delay circuit 42, whereby there is again provided an overall time delay $2T_{ss}$.

In either of these cases it can be seen that the time delay is equal to the period of the horizontal timing signal and that the described operation enables stationary patterns to be memorized so that there are always displayed at predetermined positions in the display screen to provide stationary patterns.

Also, operative association occurs between the switches 30, 31, 41, 43, 45 and 47 for changing over the display mode between the vertically separate display and the horizontally separate display. Although description of the circuits 22, 23 and 24 has been omitted for the sake of convenience, it will be apparent that these circuits and accordingly the switches corresponding to the aforesaid 21 to 47 operate in the same way as described above.

III. Signal Demodulation and Display Unit

The outputs of the signal processing circuits 21 to 24 are converted by a signal demodulation circuit 49 into signals suitable to drive the device for displaying the analytical results.

The signal demodulation circuit 49 may comprise a known signal converter, an example of which is shown in FIG. 8. Inversion circuits 55-1, 55-2, 55-3 and 55-4 are provided to receive parallel output pulses from the signal processing circuits 21 to 24 and invert these pulses. There are also provided AND-circuits 56-1, 56-2,...56-11, each of which can discriminate a particular digital amount and whose outputs are applied to circuits 57-1, 57-2,...57-11 to provide level discriminating outputs $E_1$, $E_2$, ..$E_{11}$. These output signals $E_1$, $E_2$,..$E_{11}$ are applied to the visual display device.

The visual display device may be a known black-and-white display tube, but according to the present invention it is arranged to convert spectrum levels into colors to provide a color display which can more effectively appeal to the viewers. A color Braun tube may also be employed as such a color display device, as will be described hereunder by way of example.

The color Braun tube used with the present invention is specially designed to provide the following features:

1. Only hue difference is caused to correspond to each step of intensity so as to form that color with the highest possible purity. Brightness difference may be used with hue difference.
2. Since use of too many colors prevents the viewer from sensing the one-dimensional step variation, the number of signal steps to be discriminated must be defined. According to the present embodiment, a signal is divided into 11 steps of 4 db. each to provide a dynamic range of 40 db.
3. In order to provide the sense of continuity of a one-dimensional hue difference, use is made of the color arrangement of red (R)—green (G)—blue (B) which has empirically been established with the map or the like.

Figure 9:
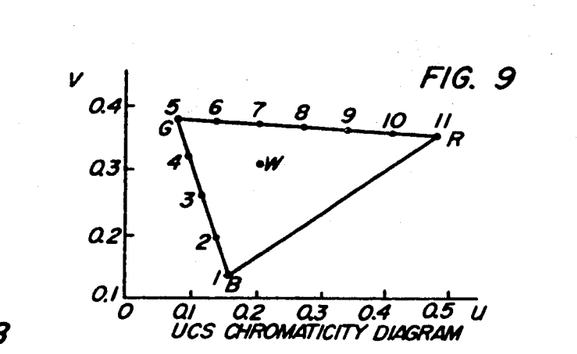
FIGS. 9 and 10 are diagrams illustrating the correlation between the colors employed for the level discrimination in an embodiment of the present invention.

According to these viewpoints, in order to determine the point of chromaticity at which the maplike color display is provided by the use of a color Braun tube employing a sulfide fluorescent substance, the present embodiment used a uniform chromaticity scale plane known as UCS plane, in which the line R–G–B passing through the three origins R, G and B is divided into 10 equal segments, as shown in FIG. 9.

Figure 10:
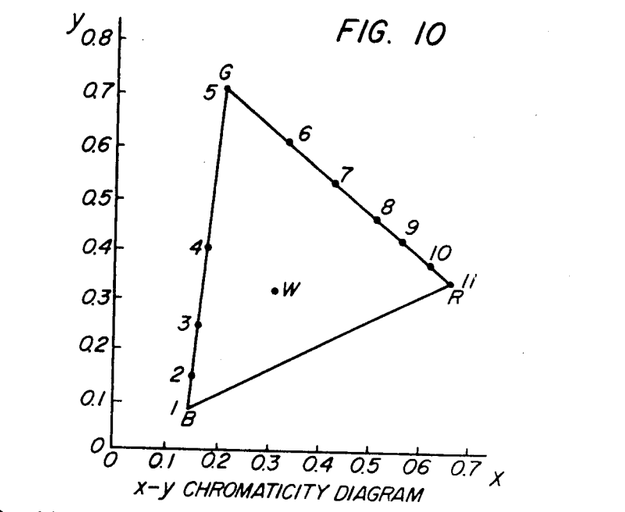

FIG. 10 shows the ordinary $x$–$y$ chromaticity diagram resulting from the conversion of the FIG. 9 diagram. If the FIG. 10 diagram is further converted into trichromatic coefficients $r$, $g$ and $b$, the results will be as shown in table 1 below. In FIGS. 9 and 10 the letter W represents a white point.

TABLE 1

| Level | r | g | b |
|---|---|---|---|
| 1 | 0 | 0 | 1 |
| 2 | 0 | 0.165 | 0.835 |
| 3 | 0 | 0.381 | 0.619 |
| 4 | 0 | 0.641 | 0.359 |
| 5 | 0 | 1 | 0 |
| 6 | 0.244 | 0.756 | 0 |
| 7 | 0.456 | 0.544 | 0 |
| 8 | 0.630 | 0.370 | 0 |
| 9 | 0.762 | 0.238 | 0 |
| 10 | 0.874 | 0.126 | 0 |
| 11 | 1 | 0 | 0 |

Figure 11:
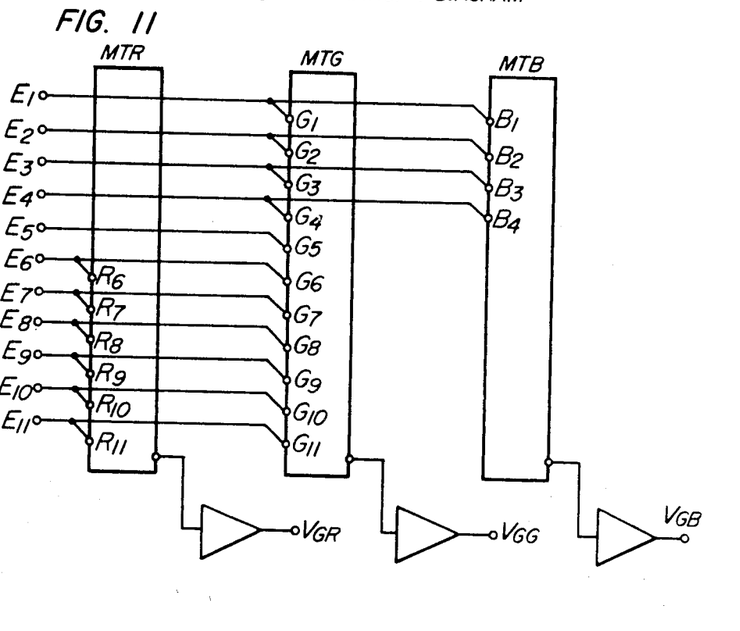
FIG. 11 is a block diagram showing the color control signal generator circuit used with the present invention.

The aforementioned output signals $E_1$ to $E_{11}$ are representative of levels 1 to 11 in table 1. FIG. 11 shows an example of the circuit for generating color control signals shown in table 1.

From table 1 it can be seen that red (R) is contained only in signals $E_6$ to $E_{11}$, blue (B) only in signals $E_1$ to $E_4$, and green (G) is related to $E_2$ to $E_{10}$. The color control signals corresponding to those levels established by the decoding matrices MTR MTG and MTB are amplified by amplifiers $AMP_R$, $AMP_G$ and $AMP_B$ respectively, whose outputs $V_{GR}$, $V_{GG}$ and $V_{GB}$ are applied to the grid RGB of the color Braun tube.

The aforesaid color matrices are adjusted so that all the colors may have a substantially equal high brightness (approximately 40 nt cd/cm.²).

In the embodiment described above, the points of chromaticity which are equally spaced on the line R–G–B in the UCS chromaticity diagram have been selected and 11-step hues have been employed, whereas it will be appreciated that other hues may also be employed.

IV Control Signal Generator Unit

Signals for controlling the process and operation of the above-described various circuits and means are generated by the control signal generator 4 shown in FIG. 1. A clock pulse having a period of $T_c$ is generated by a pulse generator and in accordance with this clock pulse, a sampling pulse having a period of $T_{sn}'T_c$ is generated by a frequency demultiplier and applied to time-compressing circuits 3 and 4. The said pulses have their said periods further increased to $n$ times by a frequency demultiplier so as to provide pulses having a period of $T_{ss}=nt_s=nn'T_c$ which determines the length of the spectrum section, and applied to the analyzer 1 and signal processing circuit 2.

Also, a pulse having a period $2T_{ss}$ resulting from the clock pulse of $T_{ss}$ through the action of the frequency demultiplier and a pulse having a period $2T_s=2T_{ss}/n$ resulting from the sampling pulse of $T_s$ through the action the demultiplier are applied as horizontal and vertical timing signals to the color display device 3. For the horizontal separate display mode, the value $T_s$ is selected as the period of the vertical timing signal by the switch 46. It will thus be appreciated that the spectrograms of the constituent frequency components of two signals $a_1$ and $b_1$ may be separately displayed vertically or horizontally on the screen of the color display device and that the respective patterns displayed may be separately selected either for the moving display mode or the stationary display mode at any a time as desired.

What is claimed is:

1. A frequency spectrum analyzer comprising:
   a frequency spectrograph for dividing a predetermined spectrum section of each of two input signals into a plurality of constituent frequency components;
   coder means for coding the intensities of said frequency components into time-sequential signals;
   a signal processing circuit for providing a predetermined time delay to said time-sequential signals to time-compress and convert said signals into analogous signals representing the intensities of said spectrum sections;
   a visual display device for visually displaying the spectrograms of said two input signals in a contrastive manner, said spectrograms representing the relation between time, frequency components and intensities thereof obtained through the analysis;
   said signal processing circuit including a changeover circuit for changing over the display mode of said display device; and
   a timing signal generator circuit for timing said circuit and said device with each other.

2. A frequency spectrum analyzer as defined in claim 1, wherein said signal processing circuit includes:
   decoder means for generating a plurality of level-representing signals in accordance with the codes selected for said time-compressed pulses; and
   means for generating color defining signals to select a series of predetermined different colors in accordance with said level-representing signals.

3. A frequency spectrum analyzer as defined in claim 1, wherein said visual display device includes:
   a color picture tube and its associated driving circuit; and
   means for providing a color display in which respective colors correspond to different intensities of the analyzed frequency components of the input signals.

4. A frequency spectrum analyzer comprising:
   a frequency spectrograph for converting a plurality of constituent frequency components of each of two input signals into time-sequential signals and selecting the spectrum sections of said two inputs alternately to combine them together into a single time-sequential signal;
   coder means for coding the frequency components constituting said time-sequential spectrum sections into signals representative of plural bits, the signals representative of each bit train being provided as parallel outputs;
   a signal processing circuit provided for each bit train and including a time compressing circuit, a gate circuit for selecting a particular portion of each spectrum section time-compressed by said time-compressing circuit and separating signals corresponding to said two input signals into two circuits, a circuit for designating the display mode for the spectrograms of said two input signals to thereby control the time range for said gate circuit to select the spectrum section, second time-compressing circuits disposed toward the outputs of said two gate circuits, each of said second time-compressing circuits including a plurality of delay circuits and associated changeover circuits arranged in a loop forming said time-compressing circuit, and a circuit for combining together the outputs of said two second time-compressing circuits into a single time-sequential signal;
   a control signal generator circuit for driving gate and switch circuits in said plurality of signal processing circuits to generate command signals representing vertical, horizontal, moving and stationary display modes for the spectrograms of said two signals; and
   a circuit for combining the outputs of said parallel signal processing circuits and converting them into color signals.

* * * * *